United States Patent [19]
Butler et al.

[11] Patent Number: 5,571,411
[45] Date of Patent: Nov. 5, 1996

[54] MAGNETIC ATTACHMENT FOR FILTERING OIL

[76] Inventors: Norman P. Butler; James Cheng; Li K. Pui, all of 7755 Arjons Dr., San Diego, Calif. 92126

[21] Appl. No.: 629,061

[22] Filed: Apr. 8, 1996

Related U.S. Application Data

[63] Continuation of Ser. No. 558,385, Nov. 16, 1995, abandoned, which is a continuation of Ser. No. 227,273, Apr. 13, 1994, abandoned.

[51] Int. Cl.$^6$ ................................................. B01D 35/06
[52] U.S. Cl. ........................................ 210/223; 335/303
[58] Field of Search ............................ 210/223; 335/285, 335/302, 303, 304; 248/205.6, 206.5

[56] References Cited

U.S. PATENT DOCUMENTS

| | | | |
|---|---|---|---|
| 2,557,434 | 6/1951 | Hoverder | 248/205.4 |
| 3,325,639 | 6/1967 | King | 248/205.6 |
| 3,460,679 | 8/1969 | Llewellyn | 210/222 |
| 3,480,145 | 11/1969 | Gladden | 210/223 |
| 4,826,592 | 5/1989 | Taylor | 210/223 |
| 4,894,153 | 1/1990 | Shirdavani | 210/222 |
| 5,078,871 | 1/1992 | McCready | 210/222 |
| 5,089,129 | 2/1992 | Brigman | 210/222 |
| 5,273,648 | 12/1993 | Caiozza | 210/222 |
| 5,282,963 | 1/1994 | Hull et al. | 210/223 |
| 5,441,647 | 8/1995 | Wascher et al. | 210/223 |

*Primary Examiner*—Matthew O. Savage
*Attorney, Agent, or Firm*—Frank G. Morkunas

[57] ABSTRACT

A housing has a magnetic block therein with (preferably) an exposed side. The housing has (preferably) an integral, annular, curved, elastomer skirt forming a suction cup. The suction cup is used to attach the magnetic block to the external side of an oil passageway, e.g. an engine oil filter cartridge, such that the exposed side abuts, or nearly abuts, the passageway, the exposed side being a centralized base of the suction cup. The magnetic lines of force emanating from the magnet penetrate beyond the wall and attract magnetically attractable particles from oil passing thereby. The particles are held against the side opposite the magnet.

9 Claims, 1 Drawing Sheet

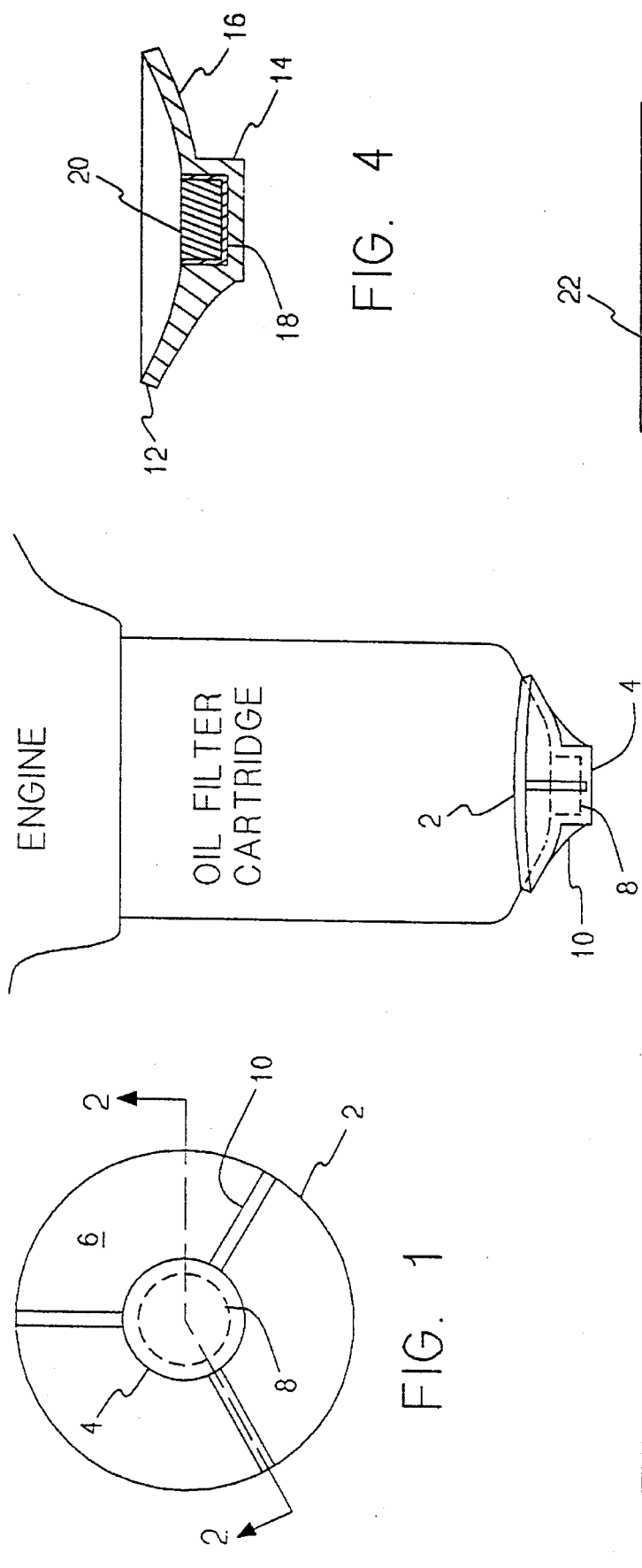

5,571,411

MAGNETIC ATTACHMENT FOR FILTERING OIL

This application is a continuation of application Ser. No. 08/558,385, filed Nov. 16, 1995, now abandoned, which was a continuation of application Ser. No. 08/227,273, which was filed on Apr. 13, 1994, now abandoned.

BACKGROUND OF THE INVENTION

This invention relates in general to magnetic devices which can be removably attached at external points to oil passageways of pre-existing lubricating oil systems for attracting and trapping from the oil minute particles of magnetically attractable materials, i.e., materials attracted by a magnetic field, and in particular to such devices that are magnetically and frictionally attached to the walls of oil passageways.

The prior art contains devices using magnetic elements to trap particles against the wall of a filter canister. However, the prior art does not teach nor suggest any such devices that use a suction cup in combination with magnetic force to attach the device to the wall of an oil passageway.

U.S. Pat. No. 3,460,679 by Llewellyn describes a plurality of magnets strapped around an oil cartridge by means of a belt. The belt is spring-like.

U.S. Pat. No. 3,480,145 by Gladden describes a molded cup that covers the base of a conventional oil filter cartridge. The cup has a plurality of magnets disposed in the walls and base.

U.S. Pat. No. 4,826,592 by Taylor describes a frame adapted to fit the outside of an oil filter cartridge. The frame has a base with an embedded magnet and an upper marginal section containing an electrostatic field generator.

U.S. Pat. No. 4,894,153 by Shirdavani describes a frame having springs and links for attaching a plurality of magnets circumferentially around an oil filter cartridge. The patent discloses specific arrangement of the poles of the magnets.

U.S. Pat. No. 5,078,871 by McCready describes a magnetic tape that is adhesively applied to the side wall of an oil filter cartridge.

U.S. Pat. No. 5,089,129 by Brigman describes various combinations of magnets attachable to an oil filter cartridge, and magnetic drain plugs.

U.S. Pat. No. 5,273,648 by Caiozza describes a variation in the cartridge wrap-around belt having magnets attached thereto.

U.S. Pat. No. 5,282,963 by Hull et al. describes a ring magnet that attaches by magnetic force to the base of a filter canister. The ring has a convex upper face which is adapted to conform to a concave underside of the canister. The patent describes the ring magnet as being reusable and there are slots defined by the ring magnet for allowing insertion of a screw driver to pry the ring from the base of a canister.

This invention can significantly help extend the life of oil lubricated engines by removing particles from the oil that abrade and wear on engine parts, such as iron chips, chips of certain carbides, and particulate of any other material that can be attracted and held by a magnetic field. Unlike the prior art, however, this invention is simply and inexpensively made, and very easy to understand and apply. Moreover it can be reused indefinitely.

Other advantages and attributes of this invention will be readily discernible upon a leading of the text hereinafter.

SUMMARY OF THE INVENTION

An object of this invention is to provide a device for removing magnetically attractable particulate from engine lubricating oil.

A further object of this invention is to provide a device for attracting and holding magnetically attractable particles against the wall of an oil passageway to remove same from the oil.

A further object of this invention is to provide a device to supplement a pre-existing oil filter cartridge in removing particles from lubricating oil.

These objects, and other objects expressed or implied in this document, are accomplished by a device for capturing magnetically attractable particles from oil flowing through an oil passageway. The device has a magnet that is held against an external side of an oil passageway wall. The magnet produces a magnetic field within the passageway for attracting and holding particles against the internal side of the wall opposite the magnet. The device can be secured against the wall by a vacuum (at least a partial vacuum) created by a suction cup to which the magnet is connected. In the case of an oil passageway wall that is magnetically attractable (e.g. a steel jacketed oil filter cartridge), the device is secured by a combination of the suction cup and the magnetic attraction between the magnet and the wall. In either case the suction cup grips the side of the wall when first applied and more strongly grips the wall after the wall goes through heating and cooling cycles. The suction cup has a central housing connected to a curved skirt annular to the housing forming a cup, the magnet being affixed within the housing. Preferably the suction cup means is sized to fit the base of a vehicle's engine oil filter cartridge. The magnet can be a block of magnetic material having sufficient magnetic intensity to penetrate beyond a wall of the oil passageway. At least a portion, preferably all, of a surface of the magnet block is exposed as a centralized base of the cup to ensure that the magnet abuts, or nearly abuts, the oil passageway when the device is pushed onto an oil passageway, e.g. a vehicle's engine oil filter cartridge. The device is further secured by inherent tackiness (which increases friction) of the concave surface of the suction cup. Optionally the device can be further secured by an adhesive applied to the concave surface. Any conventional adhesive suited for the intended purpose may be used.

BRIEF DESCRIPTION OF THE DRAWINGS

FIG. 1 is a plan view of a magnetic attachment according to this invention.

FIG. 2 is a cross-sectional view of the magnetic attachment illustrated in FIG. 1 taken along line 2—2.

FIG. 3 is an elevational view illustrating the magnetic attachment of FIG. 1 externally attached to the wall of an oil passageway, in this example to the base of an oil filter cartridge.

FIG. 4 is a cross-sectional view of a second embodiment of a magnetic attachment according to this invention taken along a line identically placed as for FIG. 3.

FIG. 5 is a cross-sectional view taken along line 2—2 of FIG. 1 illustrating an adhesive coating.

DESCRIPTION OF THE PREFERRED EMBODIMENT

Referring to the figures, illustrated is an application of this invention in combination with an engine oil filter cartridge to remove from the oil particles that can be attracted by a magnet such as iron and certain carbides.

Referring to FIGS. 1 and 2, an elastomer suction cup 2 has a central housing 4 integral with an annular curved skirt 6. Affixed within the housing is a magnetic element illustrated in the figures as a disk-like block 8. The form of the suction cup is reinforced by integral webs 10 radiating from the housing. Illustrated are three webs uniformly spaced around the housing.

Referring to FIG. 3, the embodiment illustrated in FIGS. 1 and 2 is shown attached externally to the base of a conventional oil filter cartridge. Typically the casings of such cartridges are made from magnetically susceptible steel such that a magnet can readily and forcefully attach to the canister. The device is held on the base by: (1) magnetic attraction between the disk magnet and the steel casing of the cartridge, (2) a vacuum created by the suction cup, and (3) friction enhanced by the vacuum and the tackiness of the suction cup material. Preferably the tackiness is an inherent property of the material used for the cup, for example, PVC, silicon, polyurethane. At least a portion, preferably all, of a surface of the magnet element is exposed as a centralized base of the cup to ensure that the element abuts, or nearly abuts, the oil passageway when the device is pushed onto an oil passageway, illustrated here as a vehicle's engine oil filter cartridge. The device is further secured by inherent tackiness (which increases friction) of the concave surface of the suction cup. Optionally an adhesive 22, as shown in FIG. 5, can be used to help adhere the cup to the cartridge in situations in which the casing is not magnetically attractable. Any conventional adhesive suited for the intended purpose may be used.

Referring to FIG. 4, an elastomer suction cup 12 has a central housing 14 integral with an annular curved skirt 16. Affixed within the housing is a magnetic element illustrated as a magnetic disk 20 within a steel pot 18, e.g. a conventional potted anisotropic ferrite magnet. The pot helps concentrate the magnetic lines of force around the rim of the pot and for purposes of this invention present a magnetic intensity almost equivalent to a similarly sized rare earth magnet, but at a fraction of the cost.

When the device is first attached, a vacuum is created when the suction cup is pressed against the cartridge wall. When the cartridge heats up due to the engine running, the vacuum may lessen somewhat but the force of the magnet and the tackiness of the suction cup material help to keep the device in place. When the cartridge subsequently cools down, the vacuum is enhanced.

In operation, the magnetic lines of force effectively penetrate the cartridge wall and permeate the oil within the canister, the effective range of the magnetic force within the canister dependent on the power of the magnetic element. In this way magnetically attractable particles within the oil are attracted and held against the inside of the canister's wall opposite the magnetic element.

The magnetic elements can be a variety of sizes and shapes as long as the area of the magnet presented to the oil passageway has sufficient magnetic intensity to perform as described above. It has been found that a magnetic element having a surface magnetic intensity of 1250–1300 gauss and a surface area of 0.5 to about 1.0 square inches works well with all standard automobile oil filter cartridges with ferrous metal jackets to remove particles from the oil and to help hold the device on the cartridge. In terms of holding force 5–6 lbs works well on all of the standard cartridges. Some examples of the types of magnets that can be used are disk or block magnets of rare earth, such as neodymium boron ferrite having a diameter of 0.5 inches and a thickness of 0.2 inches, ceramic magnets of about one inch square and potted magnets of about one inch diameter by ⅛–¼ inches thick. However it should be understood that the material, strength and form of the magnet can vary depending on design choice and cost, without departing from the purpose and scope of this invention.

Although the illustrations show this invention being attached only to an oil filter cartridge, it should be understood that this invention can be useful when attached to other oil passageways, such as valve covers, oil pans, steel valley pan covers, etc. The fact that this invention is so universal in its application sets it apart from the prior art.

This invention is particularly useful in enhancing the ability of conventional inexpensive car filters to filter out particulate finer than 15–20 microns. Particles smaller than that will typically pass through the filter element, but with this invention attached to the cartridge, even the finer particles will be trapped.

Another advantage of the this invention is that it is reusable. It can be pulled off an old cartridge being removed and put on the replacement cartridge.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

We claim:

1. A device for capturing magnetically attractable particles from oil flowing through an oil passageway comprising:

magnetic means, held against an external side of the oil passageway, for producing a magnetic field within the oil passageway for attracting and holding ferrous particles against an internal side of the oil passageway opposite said means means for holding said magnetic means against the oil passageway by use of at least a partial vacuum, and an adhesive for further holding said magnetic means against the oil passageway.

2. The device according to claim 1 wherein the means for holding said magnetic means comprises a suction cup means for gripping the side of the oil passageway, said magnetic means being affixed to the suction cup means.

3. The device according to claim 2 wherein the suction cup means comprises a central housing connected to a curved skirt annular to the housing forming a cup, said magnetic means being affixed within the housing.

4. The device according to claim 2 wherein the suction cup means is sized to fit the base of a vehicle's engine oil filter cartridge.

5. The device according to claim 2 wherein said magnetic means comprises a surface of a block of magnetic material having sufficient magnetic intensity to penetrate beyond the side of the oil passageway.

6. The device according to claim 5 wherein the suction cup means comprises a central housing connected to a curved skirt annular to the housing forming a cup, the block of magnetic material being affixed within the housing, at least a portion of said surface of the block being exposed as a base of the cup.

7. The device according to claim 1 wherein magnetic means comprises a surface of a block of magnetic material having sufficient magnetic intensity to penetrate beyond the side of the oil passageway.

8. A device, in combination with an oil filter having a closed end, for capturing magnetically attractable particles from oil flowing through an oil passageway within said oil filter and adjacent said closed end, comprising:

suction-cup means for gripping the closed end of said cartridge, said suction-cup means comprising a central housing having an outer periphery, an annular curved skirt having an inner periphery and an outer peripheral free edge, wherein the inner periphery of said skirt is connected to the outer periphery of said housing, said skirt forming a cup with said housing and defining a curved concave surface to attach to the closed end of the filter cartridge, wherein the curved concave surface of said skirt extends from the inner periphery thereof to the outer peripheral edge thereof and is configured and arranged to create a suction with the closed end of said oil filter upon engagement with said closed end;

magnetic means affixed within said housing for producing a magnetic field within the oil passageway for attracting and holding ferrous metal particles against an internal side of the oil passageway opposite said magnetic means.

9. The device according to claim 8, wherein said magnetic means comprises a surface of a block of magnetic material having sufficient magnetic intensity to penetrate beyond the internal side of the oil passageway, said magnetic means affixed within said housing, at least a portion of said surface of said block being exposed as a base of said cup to abut against the closed end of said cartridge.

* * * * *